(12) United States Patent
Bottari et al.

(10) Patent No.: US 7,321,362 B2
(45) Date of Patent: *Jan. 22, 2008

(54) TOUCH SCREEN PANEL WITH INTEGRAL WIRING TRACES

(75) Inventors: Frank J. Bottari, Acton, MA (US); Andrea C. Marble, Andover, MA (US); Michele L. LaCourse, Pepperell, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/489,351

(22) Filed: Jul. 19, 2006

(65) Prior Publication Data

US 2006/0256095 A1 Nov. 16, 2006

Related U.S. Application Data

(62) Division of application No. 11/116,546, filed on Apr. 27, 2005, now Pat. No. 7,102,624, which is a division of application No. 10/778,431, filed on Feb. 16, 2004, now abandoned, which is a division of application No. 09/773,979, filed on Feb. 1, 2001, now Pat. No. 6,727,895.

(51) Int. Cl.
*G06F 3/045* (2006.01)

(52) U.S. Cl. .................................... 345/174; 345/173

(58) Field of Classification Search ................ 345/173, 345/174; 178/18.01, 18.03, 18.05, 18.06; 427/58, 96.1
See application file for complete search history.

(56) References Cited

U.S. PATENT DOCUMENTS 2,711,983 A 6/1955 Hoyt
3,729,819 A 5/1973 Horie (Continued)

FOREIGN PATENT DOCUMENTS

WO WO 99/30272 6/1999

OTHER PUBLICATIONS

U.S. Appl. No. 09/775,253; Frank J. Bottari, et al.; filed Feb. 1, 2001; pp. 32 including drawings.

*Primary Examiner*—Ricardo Osorio (57) ABSTRACT

A method of manufacturing a touch panel wherein a glass substrate is coated with a resistive layer; a pattern of conductive edge electrodes and a conductive wire trace pattern are applied to the resistive layer; the conductive edge electrodes are electrically isolated from the conductive wire traces; and a protective insulative border layer is applied over the edge electrodes and the wire traces. A touch panel which includes a glass substrate coated with a resistive layer on one surface thereof; a pattern of edge electrodes on the resistive layer; a wire trace pattern on the resistive layer; a trench in the resistive layer between the wire trace pattern and the edge electrode pattern; and a protective insulative border layer over the edge electrode pattern and the wire traces.

7 Claims, 5 Drawing Sheets

U.S. PATENT DOCUMENTS

| | | |
|---|---|---|
| 3,798,370 A | 3/1974 | Hurst |
| 4,198,539 A | 4/1980 | Pepper, Jr. |
| 4,220,815 A | 9/1980 | Gibson et al. |
| 4,293,734 A | 10/1981 | Pepper, Jr. |
| 4,369,063 A | 1/1983 | McGowan et al. |
| 4,371,746 A | 2/1983 | Pepper, Jr. |
| 4,600,807 A | 7/1986 | Kable |
| 4,661,655 A | 4/1987 | Gibson et al. |
| 4,667,655 A | 5/1987 | Ogiu et al. |
| 4,694,573 A | 9/1987 | Nishino et al. |
| 4,697,885 A | 10/1987 | Minowa et al. |
| 4,731,508 A | 3/1988 | Gibson et al. |
| 4,822,957 A | 4/1989 | Talmage, Jr. et al. |
| 4,846,869 A | 7/1989 | Palanisamy |
| 5,041,701 A | 8/1991 | Wolfe et al. |
| 5,045,644 A | 9/1991 | Dunthorn |
| 5,346,651 A | 9/1994 | Oprosky et al. |
| 5,815,141 A | 9/1998 | Phares |
| 5,886,687 A | 3/1999 | Gibson |
| 5,915,285 A | 6/1999 | Sommer |
| 5,940,065 A | 8/1999 | Babb et al. |
| 6,163,313 A | 12/2000 | Aroyan et al. |
| 6,549,193 B1 | 4/2003 | Huang et al. |
| 6,727,895 B2 | 4/2004 | Bottari et al. |
| 6,781,579 B2 | 8/2004 | Huang et al. |

TOUCH SCREEN PANEL WITH INTEGRAL WIRING TRACES

CROSS REFERENCE TO RELATED APPLICATIONS

This application is a divisional of U.S. application Ser. No. 11/116,546, filed Apr. 27, 2005, now U.S. Pat. No. 7,102,624, which is a divisional of U.S. application Ser. No. 10/778,431, filed Feb. 16, 2004, now abandoned, which is a divisional of U.S. application Ser. No. 09/773,979, filed Feb. 1, 2001, issued as U.S. Pat. No. 6,727,895 on Apr. 27, 2004.

FIELD OF THE INVENTION

This invention relates to a touch screen panel with integral wiring traces which eliminates the bulky and unreliable prior art external wiring associated with touch screen panels and lowers the cost of manufacturing touch screen panel assemblies.

BACKGROUND OF THE INVENTION

Touch screen panels generally comprise an insulative (e.g., glass) substrate and a resistive layer disposed on the insulative substrate. A pattern of conductive edge electrodes are then formed on the edges of the resistive layer. The conductive electrodes form orthogonal electric fields in the X and Y directions across the resistive layer. Contact of a finger or stylus on the active area of the panel then causes the generation of a signal that is representative of the X and Y coordinates of the location of the finger or stylus with respect to the substrate. In this way, the associated touch panel circuitry connected to the touch panel by wiring traces can ascertain where the touch occurred on the substrate.

Typically, a computer program generates an option to the user (e.g. "press here for 'yes' and press here for 'no'") on a monitor underneath the touch screen panel and the conductive electrode pattern assists in detecting which option was chosen when the touch screen panel was touched by the user.

The application referred to above relates to an improved edge electrode pattern on the resistive layer of the touch screen panel. The instant application relates to an improvement in the prior art wiring harnesses attached to the touch screen.

There are typically four insulated individual wires, each extending along and around the edges of the touch screen panel to each corner of the touch screen panel where the insulation is removed and the wire is hand soldered to a terminal electrode on the panel at each corner of the panel.

One or more additional layers usually tape, are often used to secure the wires to the edges of the panel and there may be an insulative layer between the wires and the edge electrodes of the panel to electrically isolate the wires from the edge electrodes.

The problem with such prior art devices are numerous. The solder joints are often not very reliable and create solder humps on the smooth surface. Moreover, the act of soldering the ends of each wire to the corner electrodes call damage the electrodes or even crack the substrate of the touch panel. Also, this assembly process is labor intensive and hence costly.

To reduce noise, a noise shield may be place tinder the wires. Adequate noise protection, however, may not always be possible. Also, the assembled touch screen panel does not have a finished appearance. Instead, the taped on wires are bulky and readily noticeable and detract front the appearance of the touch screen panel.

SUMMARY OF THE INVENTION

It is therefore an object of this invention to provide a touch screen panel with integral wiring traces.

It is a further object of this invention to provide a touch screen panel with integral wiring traces which is more reliable than prior art touch screen panel assemblies.

It is a further object of this invention to provide a touch screen panel which has a more finished, neat, and low profile appearance.

It is a further object of this invention to provide a method of manufacturing a touch screen panel with integral wiring traces.

It is a further object of this invention to provide such a method of manufacturing a touch screen panel with integral wiring traces which eliminates the possibility of damaging the corner electrodes of the touch screen panel and which eliminates the possibility of damaging the touch screen substrate.

It is a further object of this invention to provide such a method of manufacturing a touch screen panel with integral wiring traces which is less labor intensive and less costly than prior art methods.

It is a further object of this invention to provide a touch screen panel with integral wiring traces and a protective coating over both the wire trace pattern and the edge electrode pattern.

It is a further object of this invention to provide a method of manufacturing such a touch screen panel in which the conductive silver paste of the edge electrode pattern and the wire trace pattern is co-fired with the protective coating thereby resulting in a cost and time savings.

This invention results from the realization that a more reliable, less labor intensive, less costly, and more aesthetically pleasing low profile touch screen panel assembly can be effected by integral wiring traces wherein the prior art individual wires are replaced with a wire trace pattern deposited on the resistive layer of the touch screen panel right on the panel either by printing or by some other method and then electrically isolating the wire trace pattern from the edge electrode pattern by laser etching or some other technique.

This invention features a method of manufacturing a touch panel, the method comprising coating a glass substrate with a resistive layer; applying a pattern of conductive edge electrodes to the resistive layer and applying a conductive wire trace pattern to the resistive layer and electrically isolating the conductive edge electrodes from the conductive wire traces.

The conductive layer is typically a tin antimony oxide composition and the glass substrate may be a soda lime glass composition.

The step of applying the pattern of conductive edge, electrodes and the wire trace pattern typically includes screen printing, silver/frit paste oil tile resistive layer in the form of the edge electrode pattern and the wire trace pattern. The step of electrically isolating includes using a laser beam to ablate the resistive material between the edge electrodes and the wire traces. The step of applying, a protective insulative border layer usually includes screen printing an insulative composition over the edge electrodes and the wire traces. The insulative composition is preferably a lead borosilicate glass composition.

The panel is subjected to an elevated temperature in a first period of time to burn off any organic material and then a dwell period at the elevated temperature to cure the electrodes and wire trace materials and to fuse the insulative border layer material.

The elevated temperature is typically between 500° C.-525° C., the first time period is approximately 5 minutes, and the dwell period is approximately 2-3 minutes.

A touch panel in accordance with this invention includes a glass substrate coated with a resistive layer on one surface thereof; a pattern of edge electrodes on the resistive layer; a wire trace pattern on the resistive layer; a trench in the resistive layer between the wire trace pattern and the edge electrode pattern to electrically isolate the wire trace pattern from the edge electrode pattern; and a protective insulative border layer over the edge electrode pattern and the wire traces.

The resistive layer may be a tin antimony oxide composition and the glass substrate may be a soda lime glass composition. The pattern of edge electrodes and the wire trace pattern is preferably made of a silver/frit paste composition. The protective insulative border layer is preferably formed from a lead borosilicate glass composition.

BRIEF DESCRIPTION OF THE DRAWINGS

Other objects, features and advantages will occur to those skilled in the art from the following description of a preferred embodiment and the accompanying drawings, in which.

DESCRIPTION OF THE PREFERRED EMBODIMENT

Figure 1:
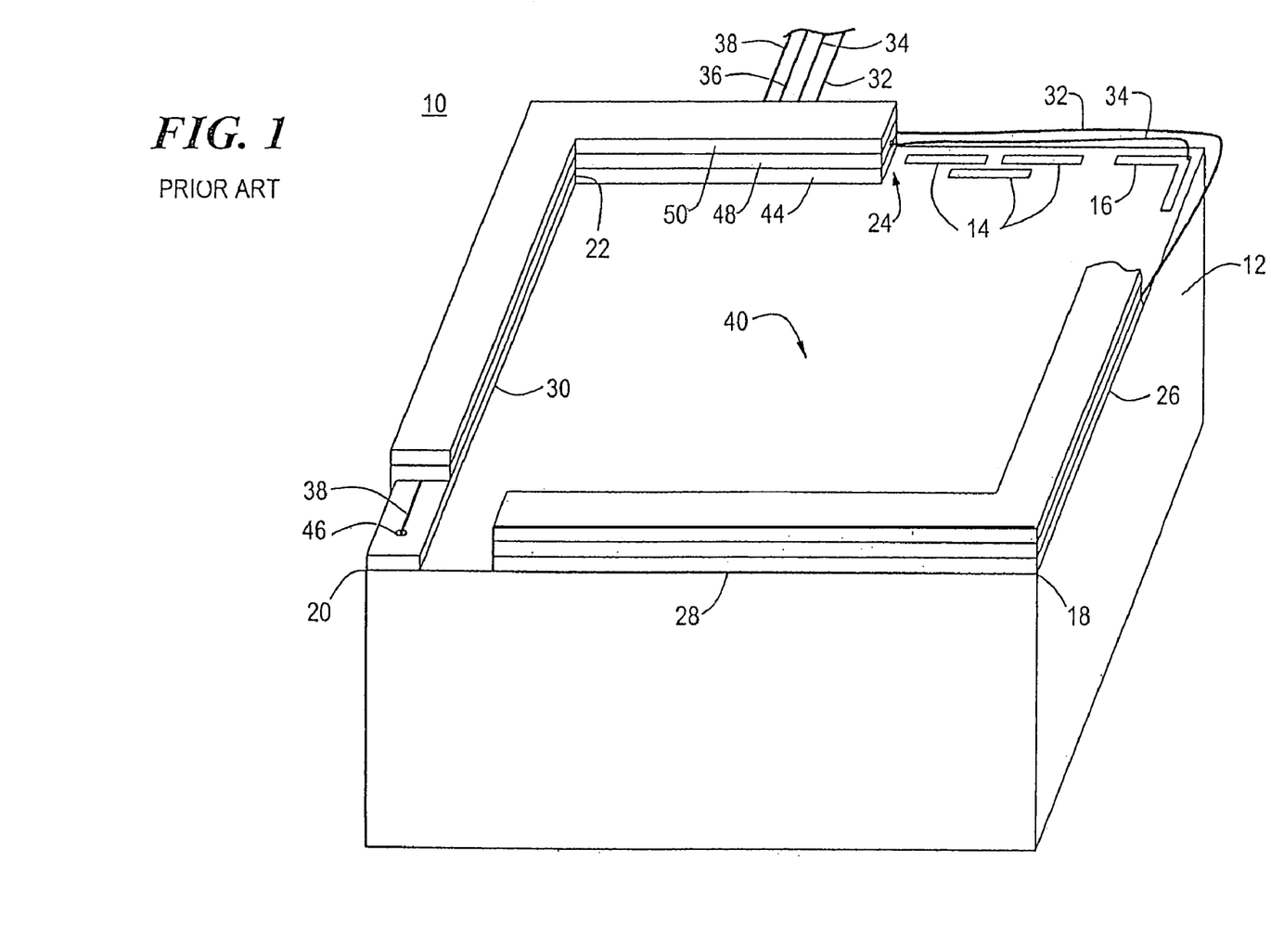
FIG. 1 is a schematic view of a prior art touch screen panel assembly.

Prior art touch screen panel 10, FIG. 1, includes substrate 12 which usually includes an insulative layer (e.g., glass), a resistive layer over the primary working surface of the insulative layer, and a pattern of conductive edge electrodes 14 and terminal electrodes, usually corner electrodes 16, on the resistive layer as is knowing in the art. There are additional corner electrodes (not shown) one at each other corner 18, 20, and 22 of the touch screen. The edge electrodes 14 repeat in some predetermined patterned fashion along each edge 24, 26, 28, and 30 of panel 10.

Wires 32, 34, 36, and 38 extend to each corner electrode and with their ends stripped of insulation are soldered to the respective corner electrodes in order to generate the appropriate electrical field across the working surface 40 of panel 10. So, for example, wire 32 extends along edges 24 and 26 of panel 10 to the corner electrode (not shown) at corner 18; wire 34 extends along edge 24 of panel 10 to corner electrode 16; wire 38 extends along edges 24 and 30 of panel 10 to a corner electrode (not shown) at corner 20; and wire 36 extends along edge 24 of panel 10 to a corner electrode (not shown) at corner 22. In some prior art embodiments, an insulative tape and then an insulated noise shield layer 44 may be laid between the wires and the edge electrodes and to electrically isolate edge electrodes 14. A hole is then formed in the insulative tape proximate each corner electrode as shown at 46 in order to solder the ends of each wire to the appropriate corner electrode. Alternatively, the tape ends proximate each corner electrode. In other embodiments, the wires are simply taped to the edges of panel 10. In still other embodiments, tape layer 48 and/or a protective (e.g. "Kapton") tape layer 50 are placed over the wires. Insulated noise shield layer 44 may be placed over the edge electrodes and under wires 32, 34, 36, and 38.

In FIG. 1, the thickness and width of border layers 44, 48, and 50 are greatly exaggerated for the purposes of illustration as is the thickness of substrate 12. Actual touch screen panels are usually ⅛ inch thick or less and layers 44, 48, and 50 are substantially thinner than that but still wires 32, 34, 36, and 38 make the completed assembly appear somewhat bulky and unfinished.

Moreover, prior art touch screen panel 10 in some cases is not very reliable because the solder joints between the individual wires and the corner electrodes can fail. Further, the act of soldering the ends of each wire to the corner electrodes can damage the electrodes or even crack the substrate of the touch screen panel. In addition, the assembly process wherein the wires are soldered at their ends to the corner electrodes and taped to the edges of the panel is labor intensive and hence costly.

In the subject invention, however, the wiring and protective layer is integrated as a part of the touch screen panel so that there are no bulky wires or layers of tape associated with the touch screen panel as is the case with the prior art.

Figure 2:
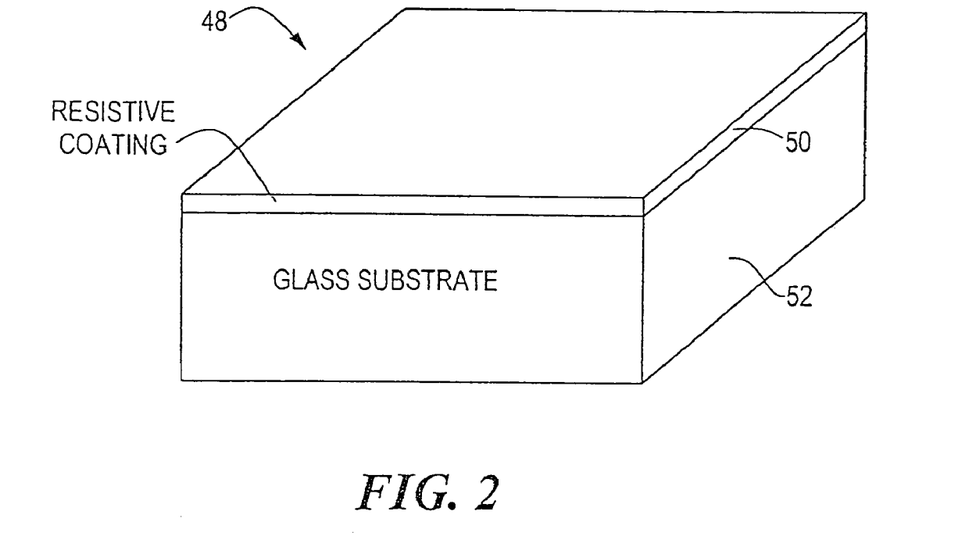
FIG. 2 is a schematic view of the touch screen panel of the subject invention just before the edge electrode pattern and the wire trace pattern are screen printed on the resistive coating.

Touch screen panel 48, FIG. 2 in accordance with this invention is manufactured by applying a resistive coating 50, (e.g., tin antimony oxide) by a vacuum sputter process to glass substrate 52 (e.g., a soda lime glass composition). Coating 50 is less than 1000 angstroms thick and substrate 52 is typically between 1-3 mm thick and 15 inches on a diagonal depending on the specific application.

Figure 3:
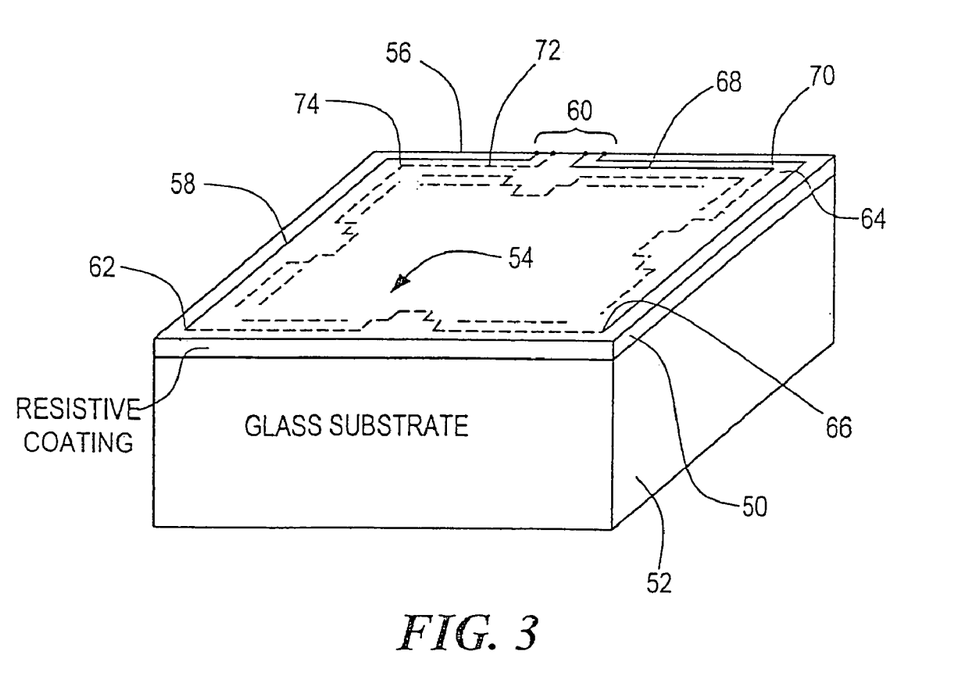
FIG. 3 is a schematic view of the touch screen panel of the subject invention after the edge electrode pattern and the wire trace pattern are screen printed on the edges of the touch screen panel.
Figure 7:
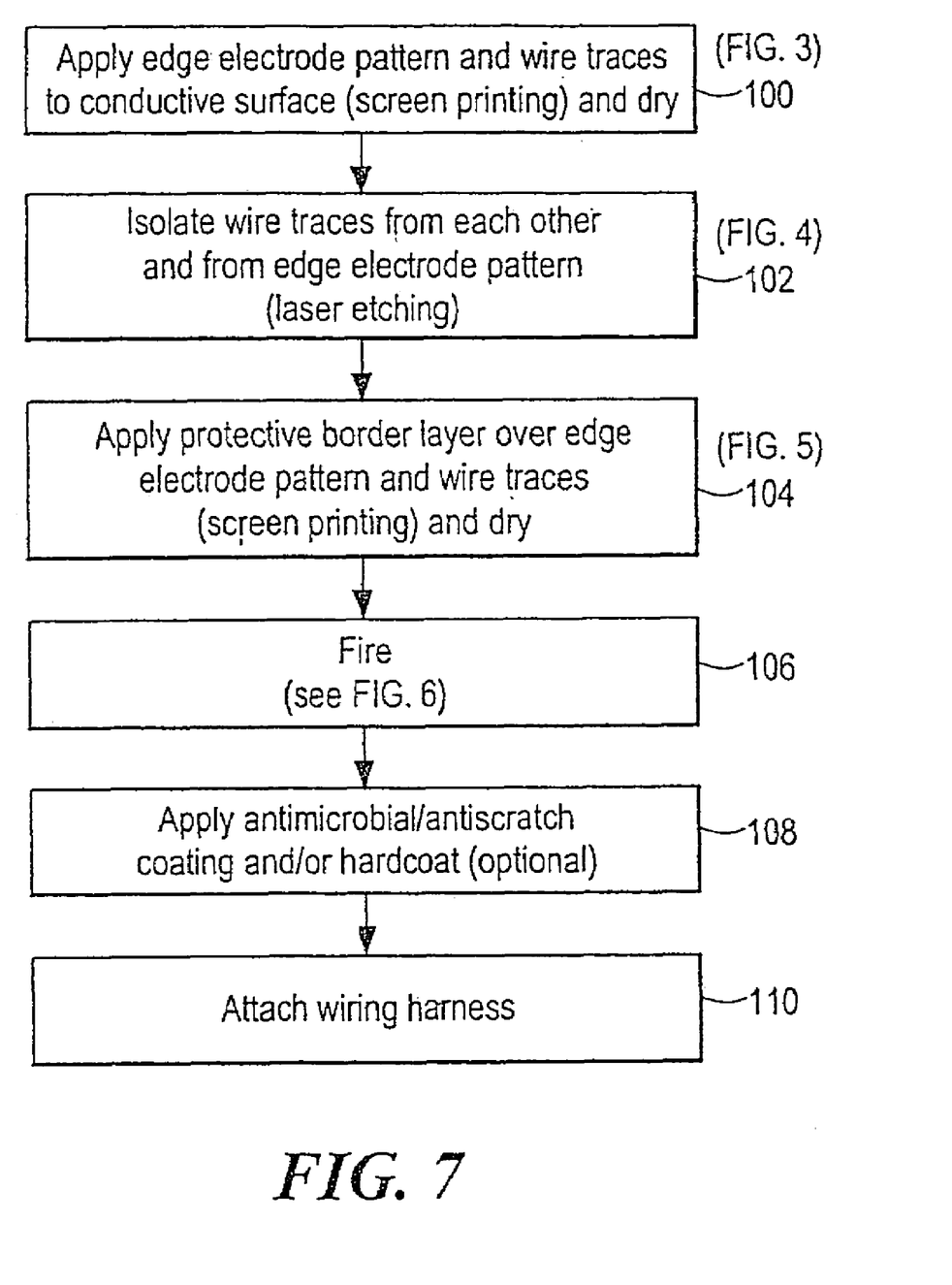
FIG. 7 is a flow chart depicting the primary manufacturing steps associated with the method of making the touch screen panel assembly in accordance with this invention.

Conductive edge electrode pattern 54, FIG. 3 is then screen printed on resistive coating 50 using a conductive silver/frit paste, (DuPont 7713) and at the same time wire trace pattern 56 is screen printed on resistive coating 50 also using conductive silver/frit paste, step 100 FIG. 7.

As shown in FIG. 3 wire trace 58 begins at junction 60 and extends along the edge of panel 48 to corner electrode 62 of edge electrode pattern 54. Wire trace 64 similarly begins at junction 60 and extends along the opposite edge of panel 48 to corner electrode 66 of edge electrode pattern 54. Wire trace 68 begins at junction 60 and extend to corner electrode 70 and wire trace 72 begins at junction 60 and extends to corner electrode 74 of edge electrode pattern 54. The height of each wire trace is typically between 12-16 microns high and between 0.015" and 0.025" wide. Junction 60 uniquely forms a single attachment location for the controller interface which creates the electrical field across the touch screen.

Edge electrode pattern 54 may take the form of the pattern disclosed in corresponding application Ser. No. 09/169,391 or the forms disclosed in U.S. Pat. Nos. 4,198,539; 4,293,734; or 4,371,746 hereby incorporated herein by this reference. Typically the edge electrode pattern and the wire trace pattern occupy only about 3/8 in. on the edges of panel 48 and thus FIG. 3 is not to scale.

After a drying operation at 120° C. for 5 minutes to dry the silver/frit paste, the next step in the process is to electrically isolate each wire trace from the electrodes of the edge electrode pattern other than the corner electrodes and, in cases where there are two or more adjacent wire traces, to electrically isolate them from each other, step 102, FIG. 7.

Figure 4:
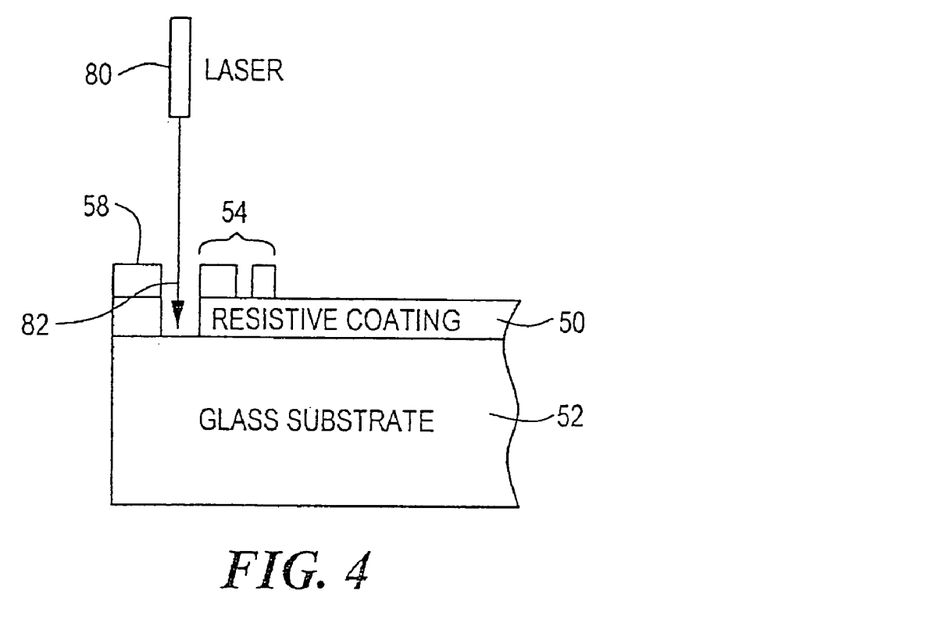
FIG. 4 is a side cut-away view of a portion of the touch screen panel of the subject invention showing how a wire trace is electrically isolated from the electrodes of the edge electrode pattern.

As shown in FIG. 4 laser 80 is used to ablate resistive coating 50 in the area between wire trace 58 and edge electrode pattern 54 to a depth typically corresponding to the top of glass substrate 52. In this way, wire trace 58 is electrically isolated from edge electrode pattern 54 and a similar technique is used to isolate wire traces 58, 72, 68, and 64 from each other wherever there are two or more traces and also from the edge electrodes of the edge electrode pattern adjacent each wire trace.

In the preferred embodiment, a Q-switched YAG laser was used to form a 0.008-0.010 inch wide trench 82 in resistive coating 50. The laser beam had a wavelength of 1.06 microns, and the average power was 32 watts. Other ablation or etching processes may be used to provide electrical isolation and, in some cases, trench 82 need not extend completely through resistive coating 50 provided electrical isolation is provided (i.e., some or a little resistive material may remain).

Figure 5:
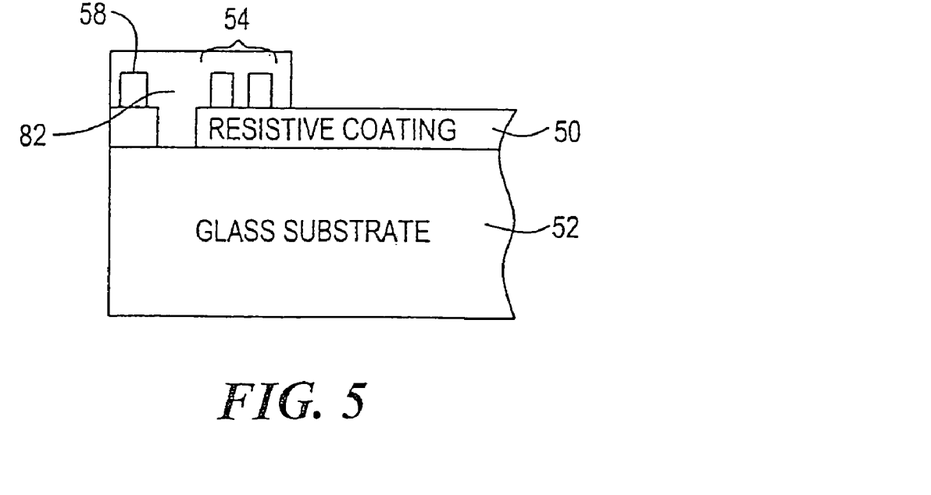
FIG. 5 is another cross-sectional view of a portion of the touch screen panel of the subject invention after the protective insulative border layer is deposited over the edge electrode pattern and the wire trace pattern.

In the next step, a protective insulative border layer, 86, FIG. 5 is deposited over the wire traces and the edge electrode pattern filling the trenches between adjacent wires and the trenches between the wire traces and the edge electrodes adjacent them. In another embodiment, the insulative material is deposited only in the trenches between the wire traces and the edge electrodes adjacent them.

In the preferred embodiment, step 104, FIG. 7, an insulative lead borosilicate glass composition (DuPont DG-150) is screen printed about the border area of the touch panel over the wire trace pattern and the edge electrode pattern. The width of border layer 86, FIG. 5 is typically about 1/2 in. and has height of about 12 microns after firing.

After lead-borosilicate-glass layer 86 dries at 120° C. for 5 minutes (an optional step) it and tile conductive silver/frit paste of the edge electrode pattern and the wire trace pattern are cured by firing, preferably at the same time in an infrared oven, step 106. FIG. 7.

During this firing step, the organic binders of the silver/frit paste and tile lead borosilicate glass layer must be allowed to escape tile outer layer before the lead borosilicate glass layer fully cures to prevent voids and defects.

Accordingly, outgassing is allowed to occur before the peak temperature in the infrared oven is reached whereupon the silver/frit paste is cured and the lead borosilicate glass fully fuses.

Figure 6:
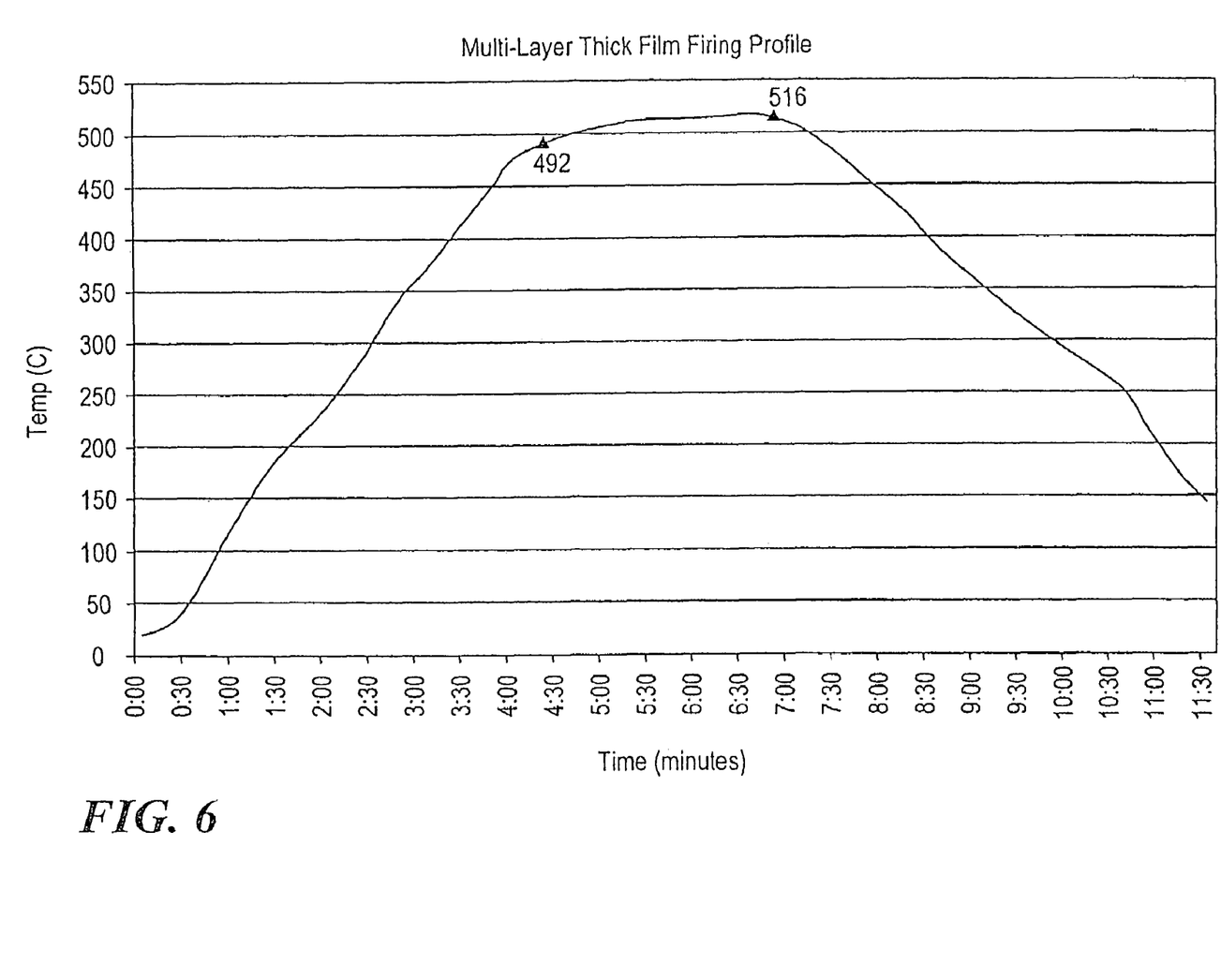
FIG. 6 is a chart showing the preferred firing dwell times and temperatures associated with manufacturing the touch screen panel of the subject invention.

As shown in FIG. 6, the preferred firing profile consists of a ramp from room temperature up to 500° C.-525° C. in approximately 5 minutes in order to complete the solvent evaporation and burn out the organic binders in the thick film materials. The ramp is followed by a dwell period above 500° C. for 2-3 minutes to allow the frit glass to melt and the silver to sinter. The substrate is then brought back to ambient temperature. An additional firing profile may consist of a ramp form room temperature to 300° C. with a dwell period between 300-400° C. for 6-10 minutes to provide additional time to burn out the organic binders if required. This dwell period is followed by a second ramp to the peak temperature of 500° C.-525° C. with little or no dwell period. The substrate is then brought back to ambient temperature. Before firing, a separate drying step is performed to evaporate the solvents in the thick film materials. The drying profile consists of a ramp to 120-135° C. for a dwell period of 2-6 minutes and then brought back to ambient temperature. The insulative lead borosilicate glass layer advantageously protects the wire traces and the edge electrodes and isolates then from each other. In the prior art, tape was used which was unsightly and often peeled up which left the edge electrodes and the wire traces unprotected. Moreover, by co-firing the paste of the edge electrode pattern and the wire traces, and the borosilicate glass protective layer, the separate firing steps of the prior art are eliminated.

After firing, a hard coat and/or an anti-microbial and/or an anti-scratch coatings may be applied to the active area of the touch panel (and optionally over the protective border layer) by spraying, and/or dipping techniques step 108, FIG. 7 and then a wiring cable is attached to junction 60, FIG. 3, step 110, FIG. 7.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A method of manufacturing a touch panel, the method comprising:
   coating an insulative substrate with a resistive layer;
   applying a pattern of conductive edge electrodes to the resistive layer and applying a conductive wire pattern to the resistive layer;
   electrically isolating the conductive edge electrodes from the conductive wire traces using a laser beam to ablate the resistive material between the edge electrodes and the wire traces and the resistive material between the wire traces; and
   applying an insulative material at least between the edge electrodes and the wire traces.

2. A method of manufacturing a touch panel, the method comprising:
   coating an insulative substrate with a resistive layer;
   applying a pattern of conductive edge electrodes to the resistive layer and applying a conductive wire pattern to the resistive layer;
   electrically isolating the conductive edge electrodes from the conductive wire traces; and
   applying a protective insulative border layer over the edge electrodes and the wire traces by screen printing an insulative composition over the edge electrodes and the wire traces.

3. The method of claim 2 in which the insulative composition is a lead borosilicate glass composition.

4. A method of manufacturing a touch panel, the method comprising:

coating an insulative substrate with a resistive layer;

applying a pattern of conductive edge electrodes to the resistive layer and applying a conductive wire pattern to the resistive layer;

electrically isolating the conductive edge electrodes from the conductive wire traces;

applying an insulative material at least between the edge electrodes and the wire traces; and firing the applied edge electrodes, the wire traces, and the insulative border layer.

5. The method of claim 4 in which firing includes subjecting the panel to an elevated temperature in a first period of time to burn off any organic material and then a dwell period at the elevated temperature to cure the electrodes and wire trace materials and to fuse the insulative border layer material.

6. The method of claim 5 in which the elevated temperature is between 500° C.-525° C., the first time period is approximately 5 minutes, and the dwell period is approximately 2-3 minutes.

7. A method of manufacturing a touch panel, the method comprising:

coating an insulative substrate with a resistive layer;

apply a pattern of conductive edge electrodes to the resistive layer and applying a conductive wire trace pattern to the resistive layer;

removing the resistive layer at least between the wire traces and the edge electrodes to electrically isolate them from each other;

applying an insulative material over both the wire traces and the edge electrodes to protect them; and co-firing the edge electrodes, the wire traces, and the insulative material all at the same time.

* * * * *

UNITED STATES PATENT AND TRADEMARK OFFICE
CERTIFICATE OF CORRECTION

| | | |
|---|---|---|
| PATENT NO. | : 7,321,362 B2 | Page 1 of 2 |
| APPLICATION NO. | : 11/489351 | |
| DATED | : January 22, 2008 | |
| INVENTOR(S) | : Frank J. Bottari | |

It is certified that error appears in the above-identified patent and that said Letters Patent is hereby corrected as shown below:

Column 1,
Line 52, Delete "layers" and insert -- layers, --, therefor.
Line 59, Delete "humps" and insert -- bumps --, therefor.
Line 60, Delete "call" and insert -- can --, therefor.
Line 64, Delete "tinder" and insert -- under --, therefor.

Column 2,
Line 1, Delete "front" and insert -- from --, therefor.
Line 57, Delete "edge," and insert -- edge --, therefor.
Line 59, Delete "printing," and insert -- printing --, therefor.
Line 59, Delete "oil tile" and insert -- on the --.
Line 63, Delete "applying," and insert -- applying --, therefor.

Column 3,
Line 65, Delete "knowing" and insert -- known --, therefor.

Column 4,
Line 23, Delete "(e.g." and insert -- (e.g., --, therefor.

Column 5,
Line 50, Delete "tile" and insert -- the --, therefor.
Line 53, Delete "106." and insert -- 106, --, therefor.
Line 55, Delete "tile" and insert -- the --, therefor.
Line 56, Delete "tile" and insert -- the --, therefor.

UNITED STATES PATENT AND TRADEMARK OFFICE
CERTIFICATE OF CORRECTION

PATENT NO. : 7,321,362 B2
APPLICATION NO. : 11/489351
DATED : January 22, 2008
INVENTOR(S) : Frank J. Bottari It is certified that error appears in the above-identified patent and that said Letters Patent is hereby corrected as shown below:

Column 6,
Line 3, Delete "form" and insert -- from --, therefor.

Signed and Sealed this

Twenty-second Day of July, 2008

JON W. DUDAS
*Director of the United States Patent and Trademark Office*